(12) United States Patent
Nakamura

(10) Patent No.: US 7,082,011 B2
(45) Date of Patent: Jul. 25, 2006

(54) RECORDING MEDIUM DRIVE CAPABLE OF PREVENTING FLEXURE OF BASE AND COVER

(75) Inventor: Yoshihiko Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 47 days.

(21) Appl. No.: 10/710,938

(22) Filed: Aug. 13, 2004

(65) Prior Publication Data

US 2005/0225893 A1 Oct. 13, 2005

(30) Foreign Application Priority Data

Apr. 13, 2004 (JP) ............................. 2004-117525

(51) Int. Cl.
*G11B 33/14* (2006.01)
(52) U.S. Cl. .................................. 360/97.01
(58) Field of Classification Search ............ 360/97.01, 360/97.02, 97.03, 97.04
See application file for complete search history.

(56) References Cited

U.S. PATENT DOCUMENTS

| | | | | |
|---|---|---|---|---|
| 5,282,101 A | * | 1/1994 | Reinisch | 360/97.03 |
| 5,582,411 A | * | 12/1996 | Tyler | 277/650 |
| 5,668,791 A | * | 9/1997 | Yamada et al. | 720/693 |
| 5,886,850 A | * | 3/1999 | Kaczeus et al. | 360/97.01 |
| 2006/0066990 A1 | * | 3/2006 | Sohn et al. | 360/97.01 |

FOREIGN PATENT DOCUMENTS

| | | | | |
|---|---|---|---|---|
| JP | | 362279587 A | * | 12/1987 |
| JP | | 9-282860 | | 10/1997 |

* cited by examiner

*Primary Examiner*—Allen Cao
(74) *Attorney, Agent, or Firm*—Armstrong, Kratz, Quintos, Hanson & Brooks, LLP

(57) ABSTRACT

A cover is received on the receiving surface of a base in a recording medium drive. A fastening mechanism serves to couple the cover to the receiving surface. An elastic member is interposed between the receiving surface and the cover. The elastic member is located along the occupied space of the fastening mechanism. The elastic member thus continuously surrounds the occupied space. When the cover is coupled to the base, the fastening mechanism urges the cover against the receiving surface of the base. Since the elastic member continuously surrounds the occupied space, the elastic member elastically deforms equally around the fastening mechanism. Flexure can thus be prevented in the base and the cover.

11 Claims, 4 Drawing Sheets

RECORDING MEDIUM DRIVE CAPABLE OF PREVENTING FLEXURE OF BASE AND COVER

BACKGROUND OF THE INVENTION

1. Field of the Invention

The present invention relates to a recording medium drive such as a hard disk drive (HDD). In particular, the invention relates to a recording medium drive comprising: a base; a cover received on a receiving surface of the base and defining an inner space between the base and the cover itself; and a fastening mechanism coupling the cover to the receiving surface of the base.

2. Description of the Prior Art

A base and a cover serve to define a closed inner space in a hard disk drive (HDD). The closed inner spaced must be protected from dust. A packing is interposed between a receiving surface of the base and the cover so as to prohibit dust from getting into the inner space. The packing continuously surrounds the inner space.

A fastening mechanism includes screws penetrating through the cover. The screws are screwed into the receiving surface of the base outside the packing. The screws strongly urge the cover against the receiving surface of the base. The cover is thus pried upward inside the packing. The contour of the HDD is deformed.

SUMMARY OF THE INVENTION

It is accordingly an object of the present invention to provide a recording medium drive capable of preventing flexure of a base and a cover coupled with each other. It is accordingly another object of the present invention to provide a packing member and a cover unit greatly useful to realize the aforementioned recording medium drive.

According to the present invention, there is provided a recording medium drive comprising: a base; a cover received on a receiving surface of the base and defining an inner space between the base and the cover itself; a fastening mechanism coupling the cover to the receiving surface of the base; and an elastic member continuously surrounding the occupied space of the fastening mechanism between the cover and the receiving surface of the base.

When the cover is to be coupled to the base, the fastening mechanism urges the cover against the receiving surface of the base in the recording medium drive. Since the elastic member continuously surrounds the occupied space of the fastening mechanism, the elastic member elastically deforms equally around the fastening mechanism. Flexure can thus reliably be prevented in the base and the cover. The fastening mechanism may comprise a depression formed in the cover, a through bore formed in the cover within the depression, and a fastening member received in the depression and penetrating through the through bore.

The aforementioned recording medium drive may further comprise a packing interposed between the receiving surface and the cover. In this case, the packing continuously surrounds the inner space. The packing thus serves to establish a sealed condition in the inner space. Moreover, when the fastening mechanism urges the cover against the receiving surface of the base, the packing elastically deforms equally around the inner space. Flexure can thus be prevented in the base and the cover.

The elastic member and the packing may be formed integral to each other. The elastic member and the packing may be adhered to the cover. When the elastic member and the packing are to be adhered to the cover, the elastic member and the packing are not necessarily positioned at the inner surface of the base in advance. Moreover, the cover can be coupled to the base in a facilitated manner. The packing may define: the inside contour described along the contour of the inner space; and the outside contour described corresponding to the inside contour. The inside contour and the outside contour may be defined in parallel with each other.

A specific packing member may be provided to realize the aforementioned recording medium drive. The packing member may comprise: a packing interposed between the base and the cover so as to surround the inner space defined between the base and the cover; an elastic member interposed between the base and the cover so as to continuously surround the occupied space of a fastening mechanism, said fastening mechanism coupling the cover to the base.

A specific cover unit may be provided to realize the aforementioned recording medium drive. The cover unit may comprise: a cover; a through bore formed in the cover and receiving a predetermined fastening member; and an elastic member adhered to the cover and continuously surrounding the through bore. The cover unit can thus easily be coupled to the base. The cover unit may comprise a packing integral to the elastic member and adhered to the cover, said packing continuously extending along the outer periphery of the cover.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
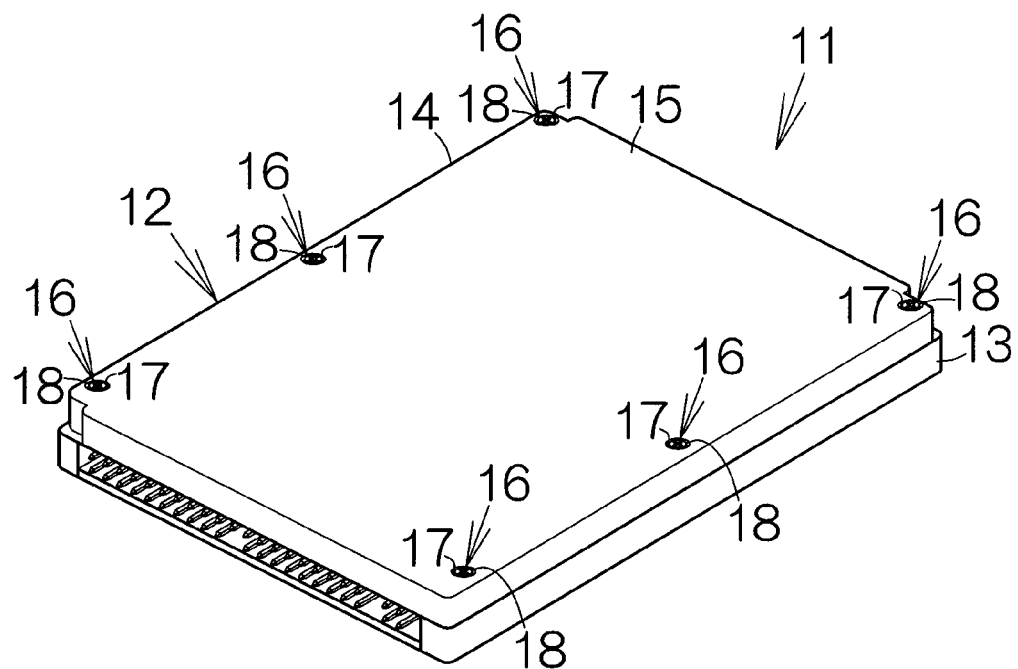
FIG. 1 is a perspective view schematically illustrating the externals of a hard disk drive (HDD) as an example of a recording medium drive according to an embodiment of the present invention.

FIG. 1 schematically illustrates the externals of a hard disk drive (HDD) 11 as an example of a recording medium drive or storage device according to an embodiment of the present invention. The HDD 11 includes a box-shaped enclosure or housing 12. The housing 12 includes a base 13. The base 13 may be made of a metal material such as aluminum or the like, for example. Molding process may be employed to form the base 13. A cover unit 14 is coupled to the base 13.

The cover unit 14 includes a cover 15 extending along a horizontal plane. The cover 15 may be made of a metal material such as stainless steel or the like, for example. Stamping process may be employed to form the cover 15.

Fastening mechanisms 16 are utilized to couple the cover unit 14 with the base 13. The individual fastening mechanism 16 includes a depression 17 formed in the cover 15 and a fastening member such as a screw 18, for example. The screw 18 is received within the depression 17.

Figure 2:
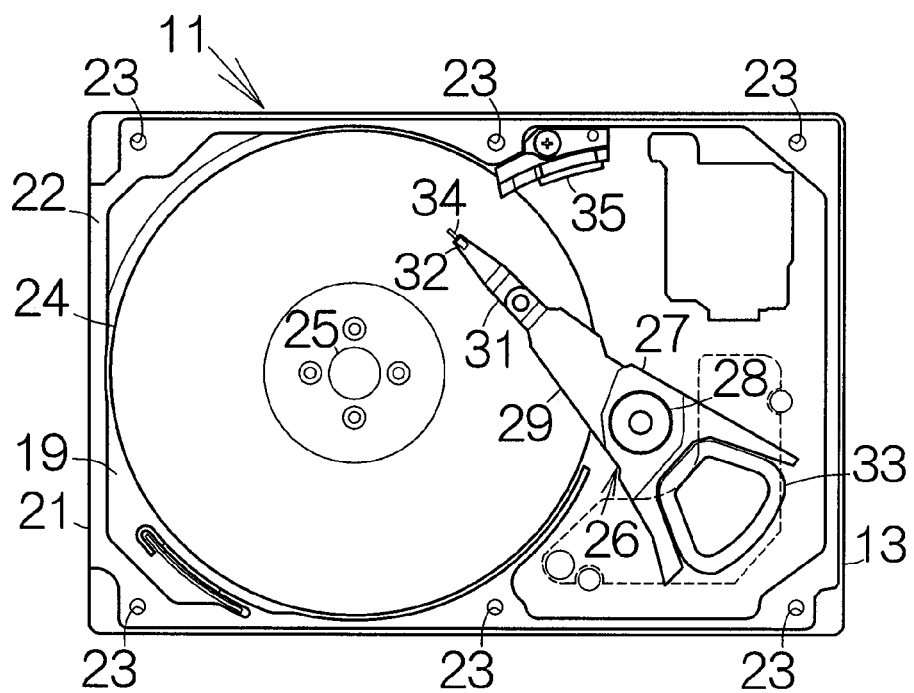
FIG. 2 is a plan view schematically illustrating the inner structure of the HDD.

As shown in FIG. 2, the base 13 includes a bottom plate 19 extending along a horizontal plane and a sidewall 21 standing from the periphery of the bottom plate 19. A receiving surface 22 is defined on the top end surface of the sidewall 21. The receiving surface 22 is designed to extend along a horizontal plane. Screw holes 23 are formed in the receiving surface 22. The aforementioned screws 18 are screwed into the screw holes 23.

The sidewall 21 serves to define an inner space inside. At least one magnetic recording disk 24 is mounted on the driving shaft of a spindle motor 25 within the inner space. The spindle motor 25 is allowed to drive the magnetic recording disk 24 for rotation at a higher revolution speed such as 5,400 rpm, 7,200 rpm, 10,000 rpm, or the like, for example.

A head actuator 26 is also accommodated in the inner space of the housing 12. The head actuator 26 includes an actuator block 27. The actuator block 27 is coupled to a vertical support shaft 28 for relative rotation. Rigid actuator arms 29 are defined in the actuator block 27 so as to extend in the horizontal direction from the vertical support shaft 28. The actuator block 27 may be made of aluminum. Molding process may be employed to form the actuator block 27.

Head suspensions 31 are fixed to the corresponding tip ends of the actuator arms 29. The individual head suspension 31 extends forward from the tip end of the actuator arm 29. A gimbal spring, not shown, is connected to the tip end of the individual head suspension 31. A flying head slider 32 is fixed on the surface of the gimbal spring. The gimbal spring allows the flying head slider 32 to change its attitude relative to the head suspension 31.

An electromagnetic transducer, not shown, is mounted on the flying head slider 32. The electromagnetic transducer may include a read element and a write element. The read element may include a giant magnetoresistive (GMR) element or a tunnel-junction magnetoresistive (TMR) element designed to discriminate magnetic bit data on the magnetic recording disk 24 by utilizing variation in the electric resistance of a spin valve film or a tunnel-junction film, for example. The write element may include a thin film magnetic head designed to write magnetic bit data into the magnetic recording disk 24 by utilizing a magnetic field induced at a thin film coil pattern.

The head suspension 31 serves to urge the flying head slider 32 toward the surface of the magnetic recording disk 24. When the magnetic recording disk 24 rotates, the flying head slider 32 is allowed to receive airflow generated along the rotating magnetic recording disk 24. The airflow serves to generate a positive pressure or lift on the flying head slider 32. The flying head slider 32 is thus allowed to keep flying above the surface of the magnetic recording disk 24 during the rotation of the magnetic recording disk 24 at a higher stability established by the balance between the urging force of the head suspension 31 and the lift.

When the head actuator 26 is driven to swing about the support shaft 28 during the flight of the flying head slider 32, the flying head slider 32 is allowed to move along the radial direction of the magnetic recording disk 24. This radial movement allows the electromagnetic transducer on the flying head slider 32 to cross a data zone between the innermost recording track and the outermost recording track. The flying head slider 32 can thus be positioned right above a target recording track on the magnetic recording disk 24. A power source 33 such as a voice coil motor (VCM) may be employed to realize the rotation of the head actuator 26, for example. The rotation of the head actuator 26 induces the swinging movement of the actuator arms 29 and the head suspensions 31.

A load tab 34 is attached to the front or tip end of the individual head suspension 31 so as to further extend in the forward direction from the head suspension 31. The load tab 34 is allowed to move in the radial direction of the magnetic recording disk 24 based on the swinging movement of the head actuator 26. A ramp member 35 is located outside the magnetic recording disk 24 on the path of movement of the load tab 34. The combination of the load tab 34 and the ramp member 35 establishes a so-called load/unload mechanism. The ramp member 35 may be made of a hard plastic material, for example.

Figure 3:
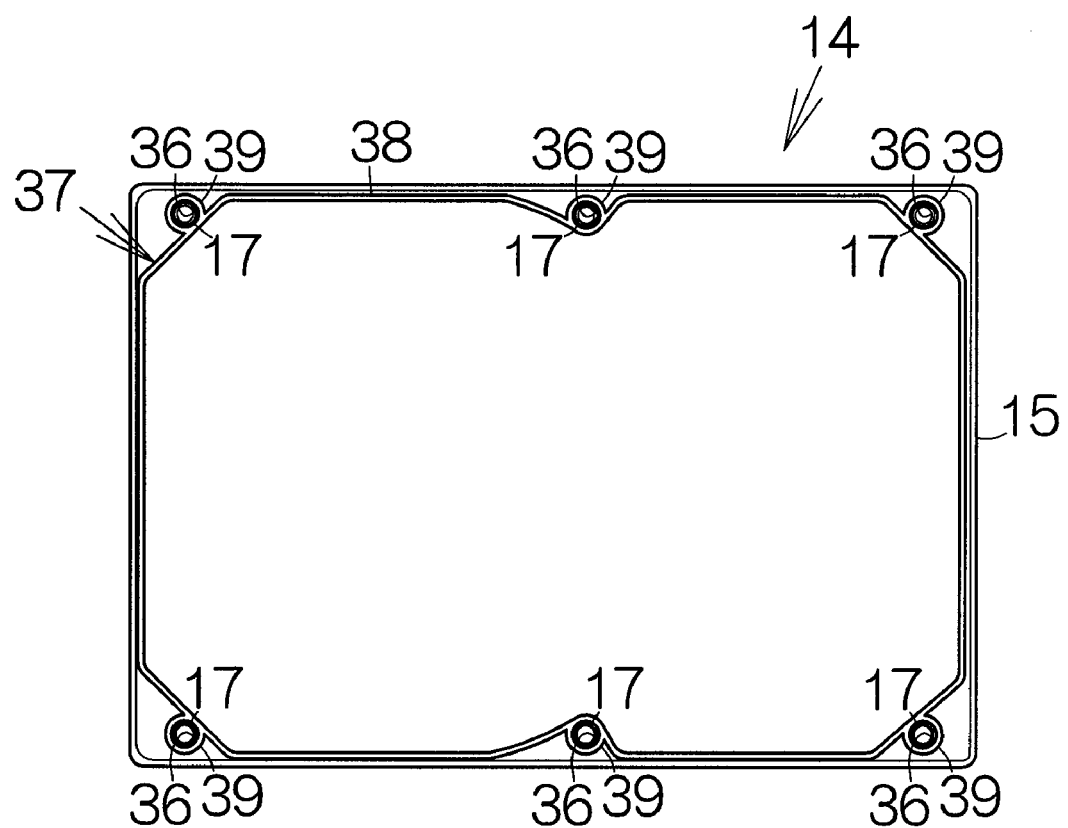
FIG. 3 is a plan view schematically illustrating the structure of a cover unit according to the present invention.

FIG. 3 schematically illustrates the structure of the cover unit 14. Through bores 36 are formed on the cover 15 so as to receive the screws 18. The through bores 36 serve to establish the fastening mechanism 16. The individual through bore 36 is located within the depression 17. The depressions 17 and the through bores 36 are located at positions corresponding to the positions of the screw holes 23, respectively. The cover unit 14 includes a packing member 37 adhered to the back surface of the cover 15. The back surface of the cover 15 is opposed to the inner space within the base 13. The thermal fusion process may be employed for adhesion of the packing member 37, for example.

The packing member 37 includes a packing 38 continuously extending along the periphery of the cover 15. Elastic members 39 are integral to the packing 38. The individual elastic member 39 continuously surrounds the depression 17 and the through bore 36 of the cover 15. Here, the elastic member 39 may be formed into an annular shape, for example. Alternatively, the elastic members 39 may take any form as long as members 39 completely surround the corresponding through bores 36. The elastic members 39 may be located at positions outside the packing 38, for example. The elastic members 39 may be made of an elastic resin material such as polyurethane or the like, for example. Molding process may be employed to form the packing 38.

Figure 4:
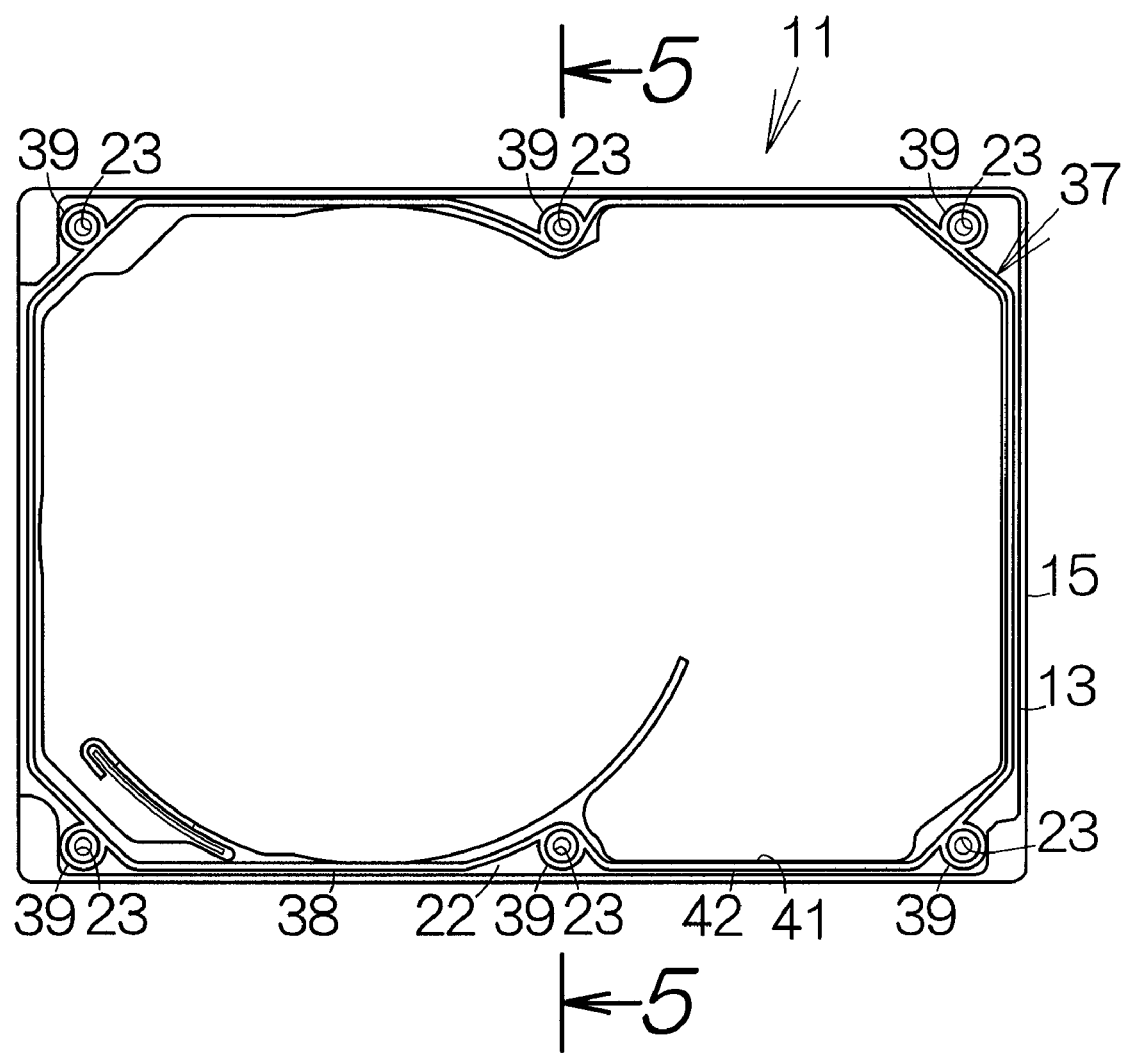
FIG. 4 is a plan view schematically illustrating a packing member located on the receiving surface of a base.

The cover unit 14 is received on the receiving surface 22 of the base 13. As shown in FIG. 4, the packing member 37 is thus located on the receiving surface 22. The packing member 37 is interposed between the receiving surface 22 of the base 13 and the cover 15. The packing 38 defines an inside contour 41 described along the contour of the inner space, and an outside contour 42 described corresponding to the inside contour 41. Here, the outside contour 42 may be parallel to the inside contour 41. The packing 38 is thus designed to continuously surround the inner space of the housing 12. A sealed condition is established in the inner space.

Figure 6:
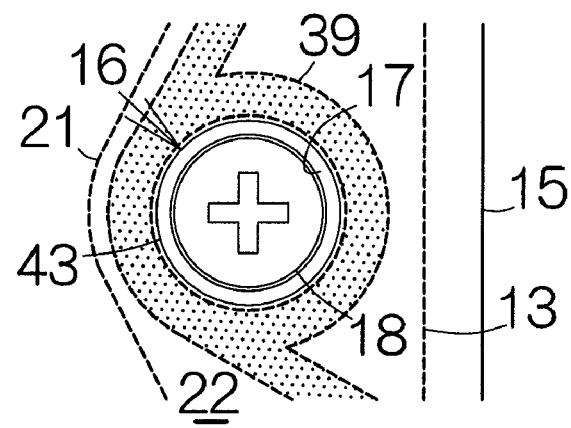
FIG. 6 is an enlarged partial plan view schematically illustrating a relationship between an elastic member and a fastening mechanism.
Figure 5:
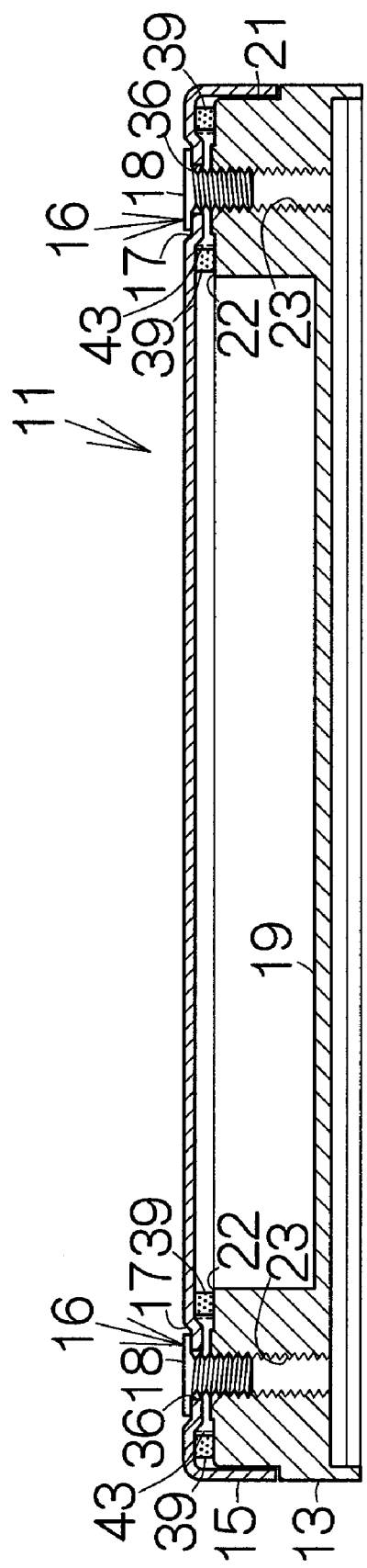
FIG. 5 is an enlarged vertical sectional view, taken along the line 5—5 in FIG. 4, for schematically illustrating the cover unit coupled to the base.

As is apparent from FIG. 5, the contour of the depression 17 is set larger than the outer diameter of head of the screw 18. The head of the screw 18 is received in the depression 17. On the other hand, the stem or threaded portion of the screw 18 penetrates through the through hole 36. The screw 18 is screwed into the screw hole 23 of the base 23 in this manner. Referring to FIG. 6, the elastic member 39 is located along an occupied space 43 of the fastening mechanism 16. The elastic member 39 thus continuously surrounds the occupied space 43. The elastic member 39 serves to establish a predetermined clearance between the base 13 and the cover 15.

Next, assume that the cover unit 14 is to be coupled to the base 13. The cover unit 14 is first prepared. First of all, the cover 15 is formed. Stamping process is employed to form the cover 15. The packing member 37 is molded into a predetermined shape. The packing member 37 is then adhered on the back surface of the cover 15. The elastic members 39 are positioned at the depressions 17. The packing 39 can thus also be positioned at the periphery of the cover 15. Thermal fusion may be practiced to adhere the packing member 37 to the cover 15. Alternatively, an adhesive may be employed to couple the packing member 37 to the cover 15, for example.

The cover unit 14 is thereafter superposed on the base 13. The screws 18 are screwed into the screw holes 23 through the through bores 36. When the screws 18 have been tightly inserted into the screw holes 23, the heads of the screws 18 strongly urge the depressions 17 or cover 15 toward the receiving surface 22 of the base 13. Since the elastic members 39 continuously surround the occupied spaces 43 of the fastening mechanisms 16, the elastic members 39 and the packing 38 elastically deforms equally around the screws 18. Flexure is prevented in the cover 15. Flexure is also prevented in the base 13.

On the other hand, in the case where the elastic members and the packing break somewhere around screws, the elastic members and the packing largely bend toward the break. The elastic members and the packing elastically deforms unequally around the screws. The base and the cover deform. Flexure is induced to destroy the regulation size of the housing. Moreover, components such as the spindle motor, the head actuator and the ramp member may suffer from less positional accuracy. The quality of the HDD cannot be improved. The HDD is supposed to get thinner in future. It is expected that the rigidity of the base and the cover is reduced. The base and the cover must reliably be prevented from flexure.

The invention claimed is:

1. A recording medium drive comprising:
    a base;
    a cover received on a receiving surface of the base and defining an inner space between the base and the cover itself;
    a fastening mechanism coupling the cover to the receiving surface of the base; and
    an elastic member continuously surrounding an occupied space of the fastening mechanism between the receiving surface of the base and the cover.

2. The recording medium drive according to claim 1, wherein said fastening mechanism comprises:
    a depression formed in the cover; a through bore formed in the cover within the depression; and a fastening member received in the depression and penetrating into the through bore.

3. The recording medium drive according to claim 1, further comprising a packing interposed between the receiving surface of the base and the cover so as to continuously surround said inner space.

4. The recording medium drive according to claim 3, wherein the elastic member and the packing are an integral member.

5. The recording medium drive according to claim 4, wherein the elastic member and the packing are adhered to the cover.

6. The recording medium drive according to claim 1, wherein the packing defines:
    an inside contour described along a contour of the inner space; and
    an outside contour described corresponding to the inside contour line.

7. A packing member for a recording medium drive, comprising:
    a packing interposed between a base and a cover of the recording medium drive and continuously surrounding an inner space defined between the base and the cover; and
    an elastic member interposed between the base and the cover and continuously surrounding an occupied space of a fastening mechanism, said fastening mechanism coupling the cover to the base.

8. A cover unit for a recording medium drive, comprising:
    a cover;
    a through bore formed in the cover and receiving a stem of a predetermined fastening member, a front surface of the cover receiving a head of the predetermined fastening member; and
    an elastic member adhered to a back surface of the cover and continuously surrounding the through bore.

9. The cover unit according to claim 8, further comprising:
    a packing being integral to the elastic member and adhered to the cover, said packing continuously extending all around an outer periphery of the cover.

10. The cover unit according to claim 8, wherein a depression is formed in the front surface of the cover so as to swell from the back surface of the cover, said through bore being located at a bottom of the depression, said elastic member continuously surrounding the depression at the back surface of the cover.

11. The cover unit according to claim 8, wherein the cover defines an inner space in cooperation with a base so that the back surface is opposed to the inner space.

* * * * *